(12) United States Patent
Shibata et al.

(10) Patent No.: US 12,031,583 B2
(45) Date of Patent: Jul. 9, 2024

(54) STRUT BEARING DEVICE, VEHICLE STRUT SUSPENSION, PRODUCING METHOD OF LOWER CASE AND SEAL OF STRUT BEARING DEVICE, AND PRODUCING METHOD OF UPPER CASE AND SEAL OF STRUT BEARING DEVICE

(71) Applicant: NAKANISHI METAL WORKS CO., LTD., Osaka (JP)

(72) Inventors: Kohei Shibata, Osaka (JP); Yasuhiro Narazaki, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 104 days.

(21) Appl. No.: 17/933,999

(22) Filed: Sep. 21, 2022

(65) Prior Publication Data
US 2023/0103901 A1    Apr. 6, 2023

(30) Foreign Application Priority Data

Oct. 1, 2021   (JP) ................................. 2021-162914

(51) Int. Cl.
*F16C 33/78* (2006.01)
*B60G 15/06* (2006.01)

(52) U.S. Cl.
CPC ........ *F16C 33/7853* (2013.01); *B60G 15/068* (2013.01); *F16C 33/7833* (2013.01); *B60G 2202/31* (2013.01); *B60G 2204/418* (2013.01); *F16C 2326/05* (2013.01)

(58) Field of Classification Search
CPC ...... F16C 19/10; F16C 19/12; F16C 33/7803; F16C 33/783; F16C 33/7833; F16C 33/784; F16C 33/7853; F16C 33/7856; F16C 33/7889; F16C 2226/70; F16C 2326/05; B60G 15/068; B60G 2204/418
See application file for complete search history.

(56) References Cited

U.S. PATENT DOCUMENTS

| | | | | |
|---|---|---|---|---|
| 4,596,054 A | * | 6/1986 | MacKendrick | F16C 33/7853 277/362 |
| 4,798,481 A | * | 1/1989 | Frank | F16C 33/7853 384/607 |
| 5,344,241 A | * | 9/1994 | Wells | F16C 19/30 384/607 |
| 2014/0044384 A1 | * | 2/2014 | Trotter | F16C 17/18 384/137 |
| 2019/0184781 A1 | | 6/2019 | Montboeuf et al. | |

FOREIGN PATENT DOCUMENTS

| | | | | |
|---|---|---|---|---|
| DE | 202010008769 U1 | * | 3/2012 | ........... B60G 15/068 |
| DE | 102013103962 A1 | * | 10/2013 | ........... B60G 13/003 |

* cited by examiner

*Primary Examiner* — Alan B Waits
(74) *Attorney, Agent, or Firm* — INNOVATION CAPITAL LAW GROUP, LLP; Vic Lin (57) ABSTRACT

Annular joint surfaces of a lower case of a strut bearing device respectively have case-side projections that project in an axial direction. Shapes A of the case-side projections, seen in an axial direction, continue in a circumferential direction, and vary their position in a radial direction along the circumferential direction. An inner-diameter side seal has a seal-side recess fitted to the case-side projection. An outer-diameter side seal has a seal-side recess fitted to the case-side projection.

4 Claims, 10 Drawing Sheets

STRUT BEARING DEVICE, VEHICLE STRUT SUSPENSION, PRODUCING METHOD OF LOWER CASE AND SEAL OF STRUT BEARING DEVICE, AND PRODUCING METHOD OF UPPER CASE AND SEAL OF STRUT BEARING DEVICE

BACKGROUND OF THE INVENTION

Field of the Invention

The present invention relates to a strut bearing device for use in a vehicle strut suspension.

Description of the Background Art

As a suspension that supports a wheel on the body of a vehicle by means of a coil spring and includes a shock absorber for absorbing vertical vibrations, there is a strut suspension in which an extendable strut containing a shock absorber is fixed to an axle. The strut suspension is widely used, mainly, for a front wheel of an automobile.

As a strut bearing device for use in an upper portion of the strut suspension, there is a strut bearing device including an upper case made of a synthetic resin for holding an upper raceway ring, a lower case made of a synthetic resin for holding a lower raceway ring, and an inner-diameter side seal and an outer-diameter side seal, which are made of elastomer and are provided in the lower case (e.g., see Patent Literature (PTL) 1)

In the strut bearing device disclosed in PTL 1, an inner seal 60 that is the inner-diameter side seal provided in an inner-diameter side of a lower cup 30 corresponding to the lower case has a seal lip 62, an outer seal 50 that is the outer-diameter side seal provided in an outer-diameter side of the lower cup 30 has seal lips 52 and 53. The seal lips 62, 52, and 53 come into slidably contact with an upper cup 40 that corresponds to the upper case.

The lower cup 30 in the strut bearing device of Patent Literature 1 has a plurality of projecting libs 36C projecting inwardly from an annular base 61 of an inner seal 60, and a plurality of projecting libs 35C projecting inwardly from an annular base 51 of an outer seal 50. The projecting libs 35C and 36C each have a triangle shape, and are arranged separately in a circumferential direction (see PTL 1, FIGS. 2 and 3, and claim 1).

CITATION LIST

Patent Literature

[PTL 1] US Patent Application Publication No. 2019/0184781

SUMMARY OF INVENTION

Technical Problem

In the invention of PTL 1, the plurality of projecting libs 36C increase an area of a joint interface between the inner seal 60 and the lower cup 30, and the plurality of projecting libs 35C increase an area of a joint interface between the outer seal 50 and the lower cup 30. This configuration increases joining strength by chemical bonding in each of the joint interfaces.

In such an invention of PTL 1, if an interval between adjacent ones of the plurality of projecting libs 35C in the circumferential direction and an interval between adjacent ones of the plurality of projecting libs 36C in the circumferential direction are enlarged, the joining strength by the chemical bonding in each of the joint interfaces is hardly increased. In contrast, if the interval between adjacent ones of the plurality of projecting libs 35C in the circumferential direction and the interval between adjacent ones of the plurality of projecting libs 36C are narrowed for increasing the joining strength by the chemical bonding in each of the joint interfaces by increasing the number of the projecting libs 35C and the number of the projecting libs 36C, thin portions are generated in a molding die used for molding the lower cup 30, causing a risk of breakage of the molding die to be increased.

A purpose of the present invention is to increase the joining strength of a seal in the strut bearing device, and to lower a risk of the breakage of a molding die for molding the seal.

Solution to Problem

The gist of the present invention is as follows.
(1) A strut bearing device including: an uppercase; a lower case; an upper raceway ring held by the upper case; a lower raceway ring held by the lower case; a rolling element that rolls between the upper raceway ring and the lower raceway ring; and a seal positioned in at least one of a radially inner side of the rolling element and a radially outer side of the rolling element, in which the upper case and the lower case are made of a synthetic resin, the seal is made of elastomer, the seal has an annular base and a seal lip projecting from the annular base, the annular base has an axially end face from which no seal lip projects, the axially end face being in tightly contact with an annular joint surface of the upper case or an annular joint surface of the lower case, the annular joint surface has one of a case-side projection projecting in an axial direction and a case-side recess dented in the axial direction, each of the case-side projection and the case-side recess has a shape seen in the axial direction, the shape continuing in a circumferential direction and varying a position of the shape in a radial direction along the circumferential direction, and the seal has one of a seal-side recess having a shape that is fitted to the case-side projection, and a seal-side projection having a shape that is fitted in the case-side recess.
(2) A vehicle strut suspension including the strut bearing device according to (1).
(3) A method of producing a lower case and a seal which are included in a strut bearing device that includes: an upper case; a lower case; an upper raceway ring held by the upper case; a lower raceway ring held by the lower case; a rolling element that rolls between the upper raceway ring and the lower raceway ring; and a seal positioned in at least one of a radially inner side of the rolling element and a radially outer side of the rolling element, in which the lower case is made of a synthetic resin, the seal is made of elastomer, the seal has an annular base and a seal lip projecting from the annular base, the annular base has an axially end face from which no seal lip projects, the axially end face being in tightly contact with an annular joint surface of the lower case, the annular joint surface of the lower case has one of a case-side projection projecting in an axial direction and a case-side recess dented in the axial direction, each of the case-side projection and the case-side recess, of the lower case, has a shape seen in the axial direction, the shape continuing in a circumferential direction and varying a position of the shape in a radial direction along the circumferential direction, the method including: an injection molding step of injecting the synthetic resin that is melted, from a gate of a first molding die for molding the lower case having the shape, and an insert injection molding step of injecting the elastomer that is melted, from a gate of a second molding die, in a state where the lower case removed from the first molding die is placed, as an insert work, in the second molding die for molding the seal having the shape.

(4) A method of producing an upper case and a seal which are included in a strut bearing device that includes: an uppercase; a lower case; an upper raceway ring held by the upper case; a lower raceway ring held by the lower case; a rolling element that rolls between the upper raceway ring and the lower raceway ring; and a seal positioned in at least one of a radially inner side of the rolling element and a radially outer side of the rolling element, in which the upper case is made of a synthetic resin, the seal is made of elastomer, the seal has an annular base and a seal lip projecting from the annular base, the annular base has an axially end face from which no seal lip projects, the axially end face being tightly in contact with an annular joint surface of the upper case, the annular joint surface of the upper case has one of a case-side projection projecting in an axial direction and a case-side recess dented in the axial direction, each of the case-side projection and the case-side recess, of the upper case, has a shape seen in the axial direction, the shape continuing in a circumferential direction, and varying a position of the shape in a radial direction along the circumferential direction, the method including: an injection molding step of injecting the synthetic resin that is melted, from a gate of a first molding die for molding the upper case having the shape, and an insert injection molding step of injecting the elastomer that is melted from a gate of a second molding die in a state where the upper case removed from the first molding die is placed, as an insert work, in the second molding die for molding the seal having the shape.

Advantageous Effects of Invention

According to the strut bearing device of the present invention, the strut bearing device using a lower case produced in accordance with the method of producing the lower case of the strut bearing device of the present invention, and the strut bearing device using an upper case produced in accordance with the method of producing the upper case of the strut bearing device of the present invention, can exhibit below shown effects.

An annular base of a seal positioned at least one of a radially inner side of a rolling element and a radially outer side of the rolling element in the strut bearing device has an axially end face, from which a seal lip does not project. The end surface is in tightly contact with an annular joint surface of the upper case or the lower case. The annular joint surface has one of a case-side projection projecting in an axial direction and a case-side recess dented in the axial direction. Shapes of the case-side projection and the case-side recess, seen in the axial direction, continue in a circumferential direction and vary their positions in a radial direction along the circumferential direction. The seal has one of a seal-side recess fitted to the case-side projection and a seal-side projection fitted in the case-side recess.

Accordingly, the shape of the joint interface between the seal-side recess and the case-side projection, or between the seal-side projection and the case-side recess, is a wave shape that continues in the circumferential direction. Therefore, an area of the joint interface of the seal with the upper case or the lower case, to which the seal is joined, increases. Accordingly, joining strength due to chemical bonding is increased at the joint interface. Furthermore, since the shape of the joint interface between the seal-side recess and the case-side projection, or between the seal-side projection and the case-side recess, seen in the axial direction, continues in the circumferential direction, the seal is engaged with the upper case or the lower case, to which the seal is joined, in the circumferential direction and the radial direction. Accordingly, the seal is connected to one of the upper case and the lower case, to which the seal is joined, with chemical bonding and mechanical bonding, to thereby increase contact reliability. In addition, no thin portion is generated in a mold for molding the upper case or the lower case, which has the case-side projection or the case-side recess, thereby lowering a risk of breakage of the molding mold.

DESCRIPTION OF EMBODIMENTS

Hereinafter, embodiments of the present invention are described, with reference to the drawings.

Figure 1:
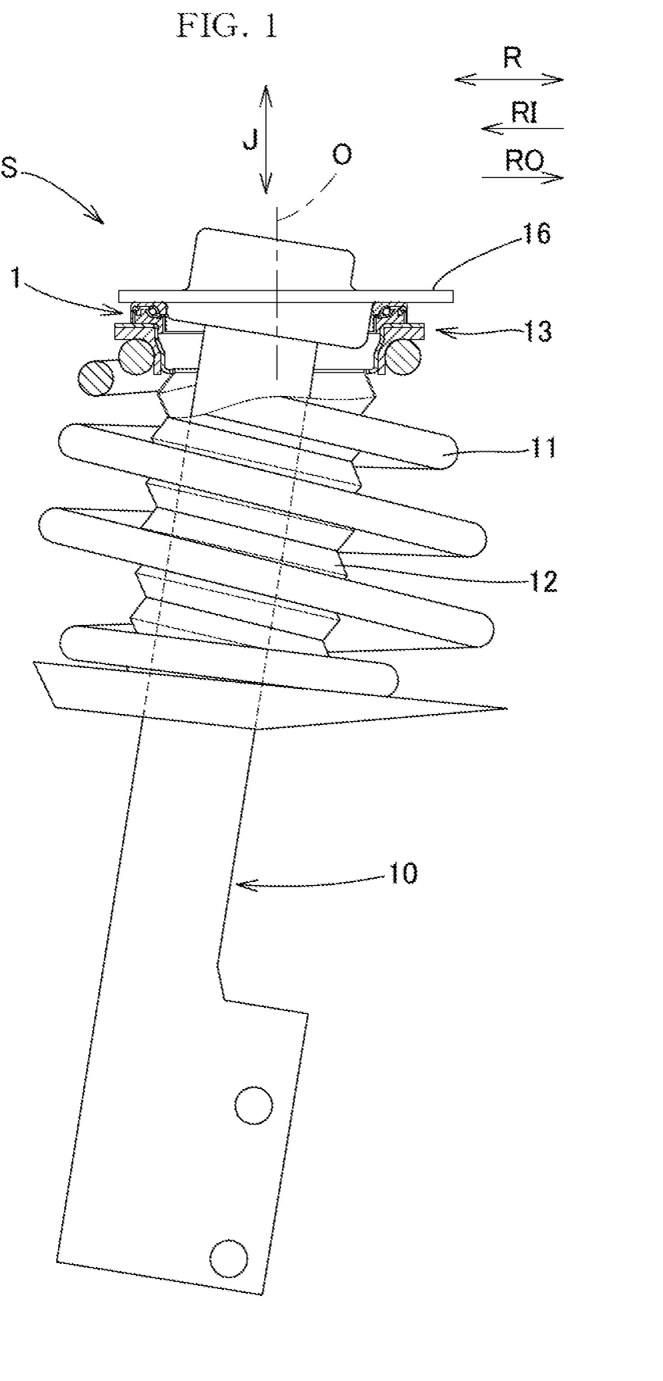
FIG. 1 is a schematic view with a partially cross-sectional view, showing a vehicle strut suspension provided with a strut bearing device according to an embodiment of the present invention.

In the description, a direction parallel to a rotation axis O (see FIG. 1) of a strut bearing device 1 is referred to as an "axial direction" (see an arrow J in FIG. 1, for example), a direction orthogonal to the rotation axis O is a "radial direction" (see an arrow R in FIG. 1, for example), a direction approaching the rotation axis O is referred to as a "radially inner direction" (see an arrow RI in FIG. 1, for example), and a direction going away from the rotation axis O is referred to as a "radially outer direction" (see an arrow RO in FIG. 1, for example). When the rotation axis O is defined as a vertical direction, a horizontal direction that is orthogonal to the radial direction extending from the rotation axis O is referred to as a "circumferential direction" (see an arrow C in FIG. 8, for example).

<Strut Suspension>

A vehicle strut suspension S shown in the schematic view with the partially vertical cross-sectional view of FIG. 1 is used in a state where an extendable strut 10 containing a shock absorber is fixed to an axle (not shown) and an upper mount 16 is fixed to a body of a vehicle.

An upper portion of the strut suspension S is provided with a strut bearing device 1 that is swingably rotated in proportion to a change in the direction of a steering wheel due to steering operation, while supporting the vehicle body. The swing angle of the strut bearing 1 is defined so as to correspond to an allowable steering angle of a wheel, and is set in a range of 40° or more and 50° or less, for example.

A coil spring 11 that is a suspension spring, and a dust boot 12 for protecting an oil seal of the shock absorber from foreign substances such as sand are provided on an outer-diameter side of the strut 10 in the radially outer direction RO. The strut suspension S includes a spring support component 13 for supporting an upper end of the coil spring 11. The spring support component 13 includes an upper spring sheet 14 and an upper insulator 15, as shown in the vertical cross-sectional view of FIG. 2.

<Strut Bearing Device>

Figure 2:
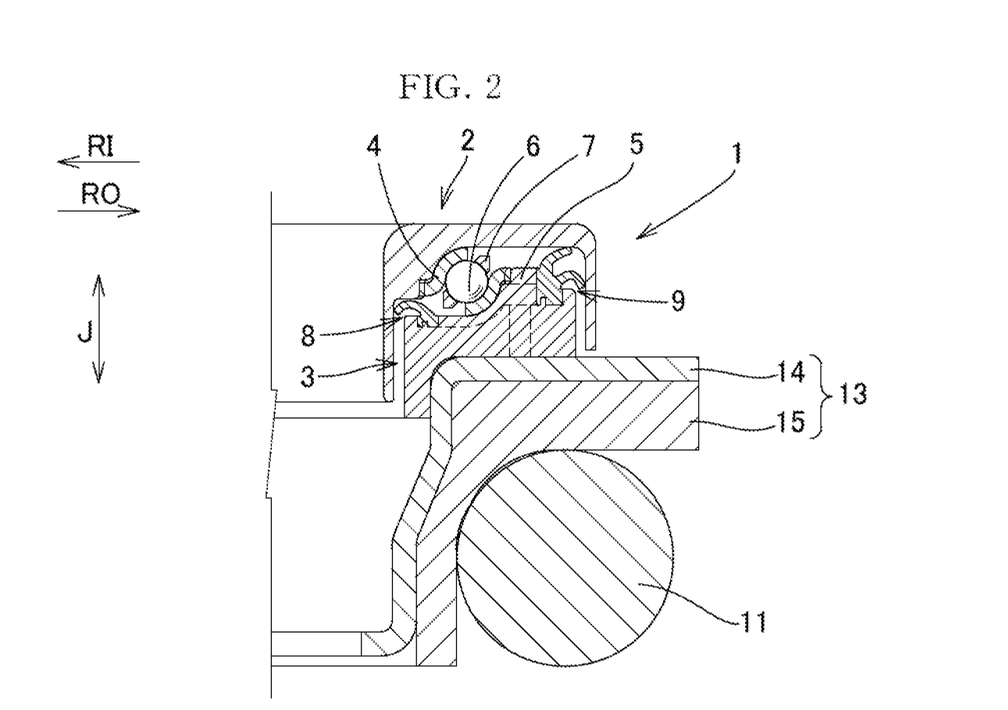
FIG. 2 is an enlarged vertical cross-sectional view of a main part including the strut bearing device, a spring support component, and a coil spring.
Figure 3:
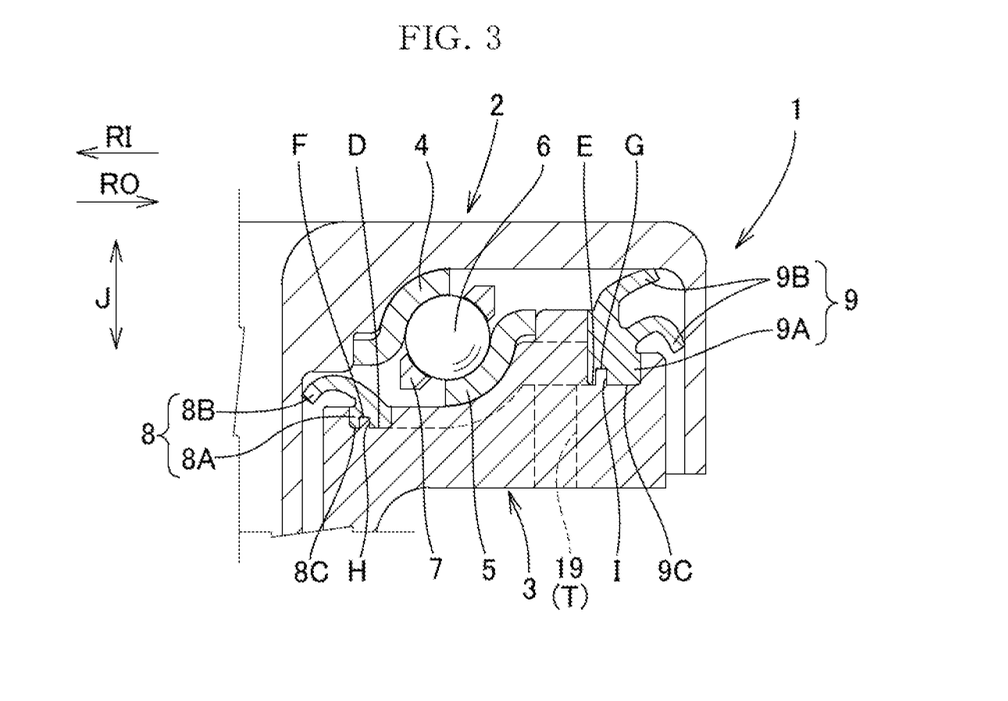
FIG. 3 is an enlarged vertical cross-sectional view of a main part of the strut bearing device.
Figure 4A:
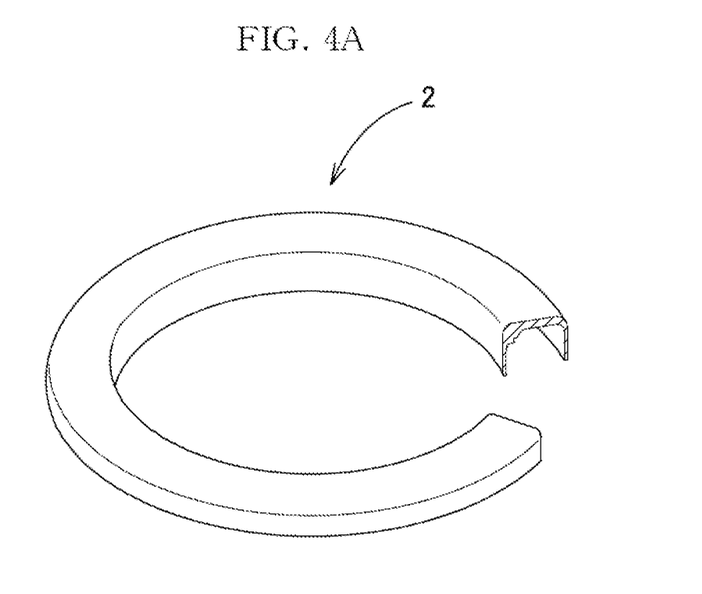
FIG. 4A is a perspective view with a partially vertical cross-sectional view, showing an upper case seen from above.
Figure 4B:
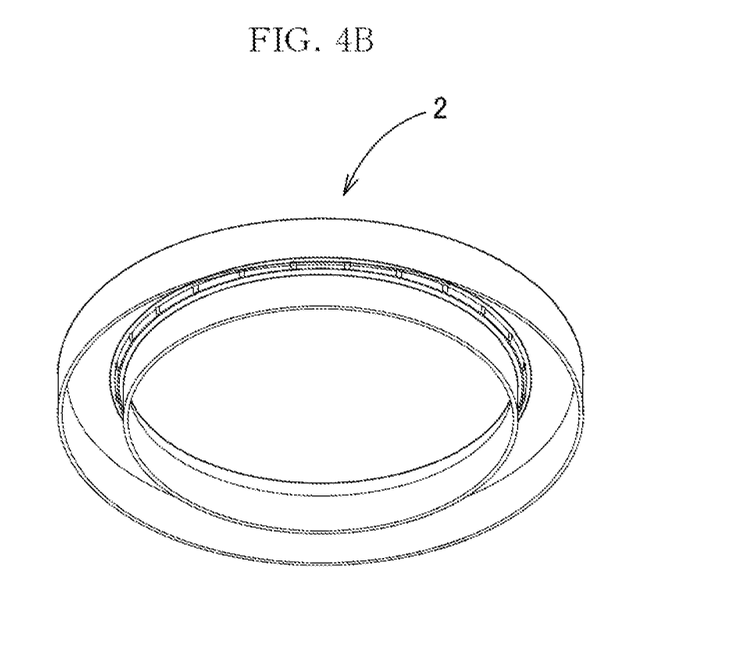
FIG. 4B is a perspective view of the upper case seen from below.
Figure 5:
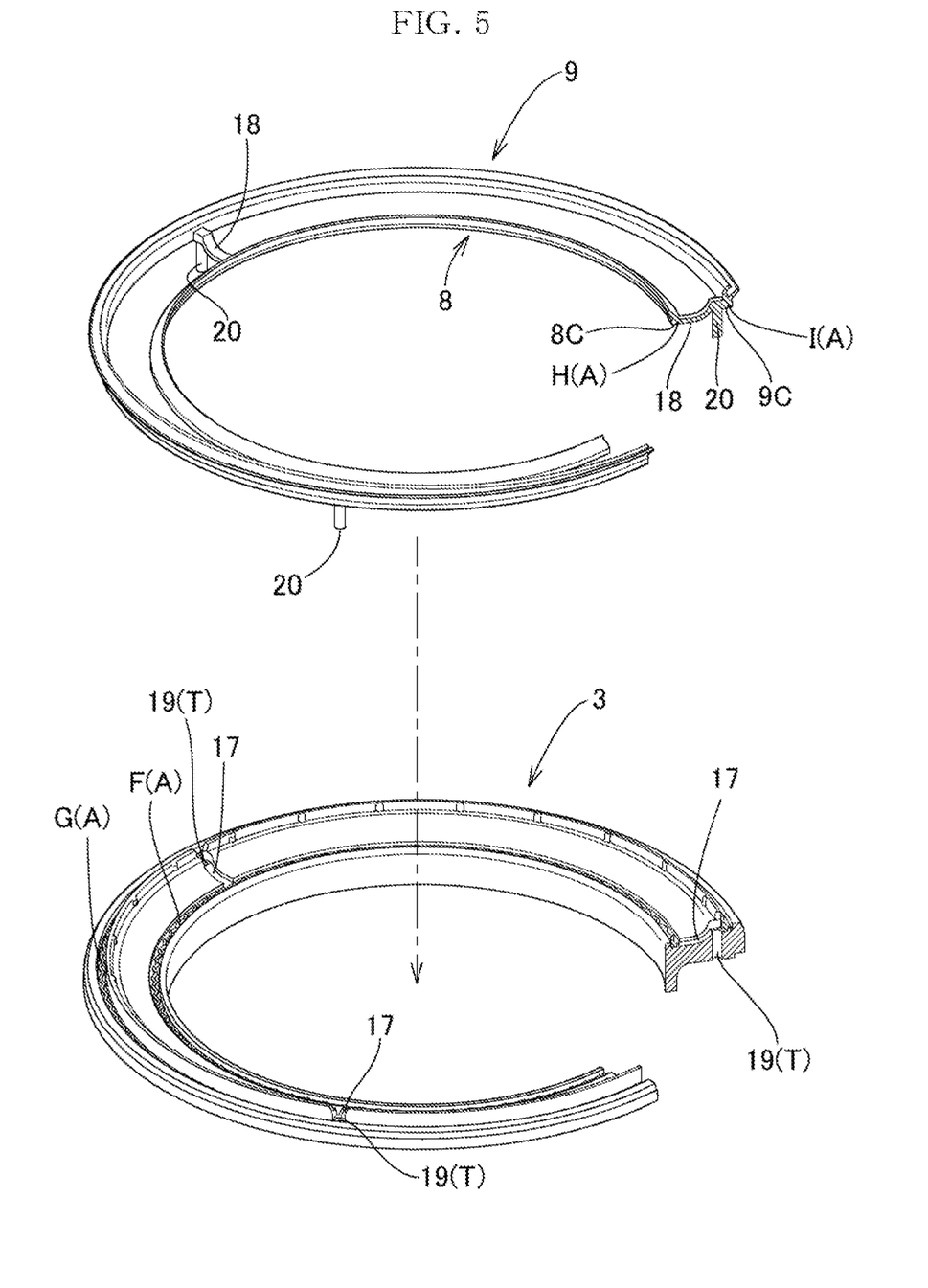
FIG. 5 is a perspective view with a partially vertical cross-sectional view, seen from above, showing the lower case, an inner-diameter side seal, and an outer-diameter side seal, in which the lower case is separated from the inner-diameter side seal and the outer-diameter side seal.

As shown in the schematic view of FIG. 1, the vertical cross-sectional views of FIGS. 2 and 3, the perspective view with the partially vertical cross-sectional view of FIG. 4A, the perspective view of FIG. 4B, and the perspective view with the partially vertical cross-sectional view of FIG. 5, the strut bearing device 1 includes an upper case 2, a lower case 3, an upper raceway ring 4, a lower raceway ring 5, rolling elements 6, a retainer 7, an inner-diameter side seal 8, an outer-diameter side seal 9, and so on.

The upper case 2 is fixed to the upper end portion of the strut 10, and the lower case 3 receives the upper spring sheet 14 from above. The upper raceway ring 4 is held by the upper case 2, and the lower raceway ring 5 is held by the lower case 3. The rolling elements 6 roll between the upper raceway ring 4 and the lower raceway ring 5, and the retainer 7 holds each of the rolling elements 6 so that the adjacent rolling elements 6 do not come into contact with each other.

The inner-diameter side seal 8 is positioned in a radially inner direction RI relative to the rolling elements 6, and the outer-diameter side seal 9 is positioned in a radially outer direction RO relative to the rolling elements 6. The inner-diameter side seal 8 and the outer-diameter side seal 9 are joined to the lower case 3 in the present embodiment.

The upper raceway ring 4 and the lower raceway ring 5 are made of steel, and are formed by performing press working on a steel plate, and then undergoing quenching to be hardened. The upper case 2 and the lower case 3 are made of a synthetic resin, and the inner-diameter side seal 8 and the outer-diameter side seal 9 are made of elastomer.

The synthetic resin for forming the upper case 2 and the lower case 3 is polyamide (PA66, PA46, PA612, PA6, PA9T, PA10T, and so on) and contains 20 to 60% by weight of glass fiber (GF) as reinforced fiber, for example.

The elastomer used for the inner-diameter side seal 8 and the outer-diameter side seal 9 is thermoplastic elastomers (TPE) including TPS (styrene-based elastomer), TPO (olefin-based elastomer), TPU (urethane-based elastomer), TPA (amide-based elastomer), TPEE (ester-based elastomer), and so on.

<Inner-Diameter Side Seal, Outer-Diameter Side Seal, and Annular Joint Surface>

As shown in the vertical cross-sectional view of FIG. 3, the inner-diameter side seal 8 includes an annular base 8A and a seal lip 8B projecting from the annular base 8A, and the outer-diameter side seal 9 includes an annular base 9A and a seal lip 9B projecting from the annular base 9A. The seal lips 8B and 9B come into slidably contact with the upper case 2.

Figure 6:
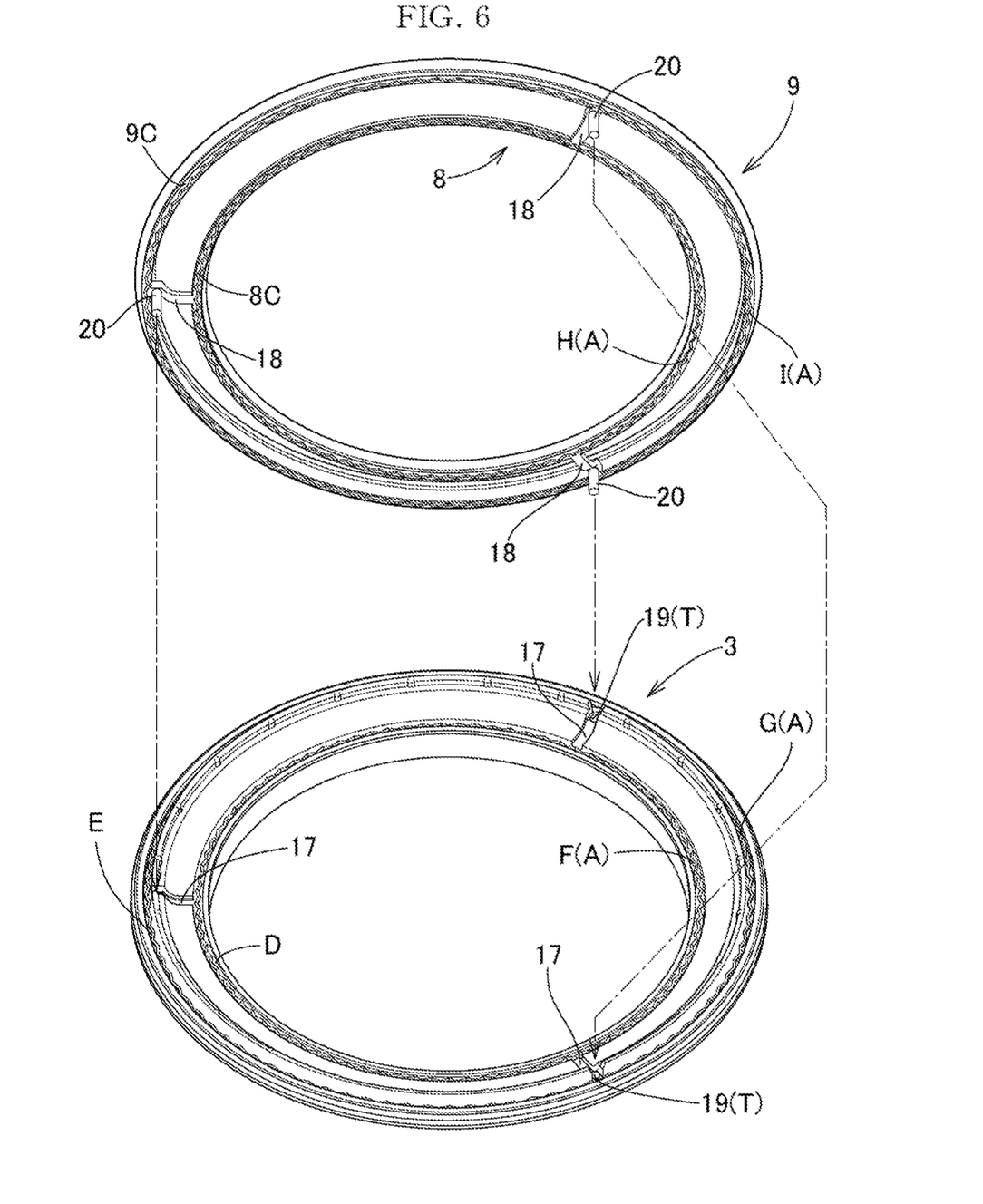
FIG. 6 includes a perspective view showing the lower case, seen from above, and a perspective view showing the inner-diameter side seal and the outer-diameter side seal, seen from below, in which the lower case is separated from the inner-diameter side seal and the outer-diameter side seal.
Figure 7:
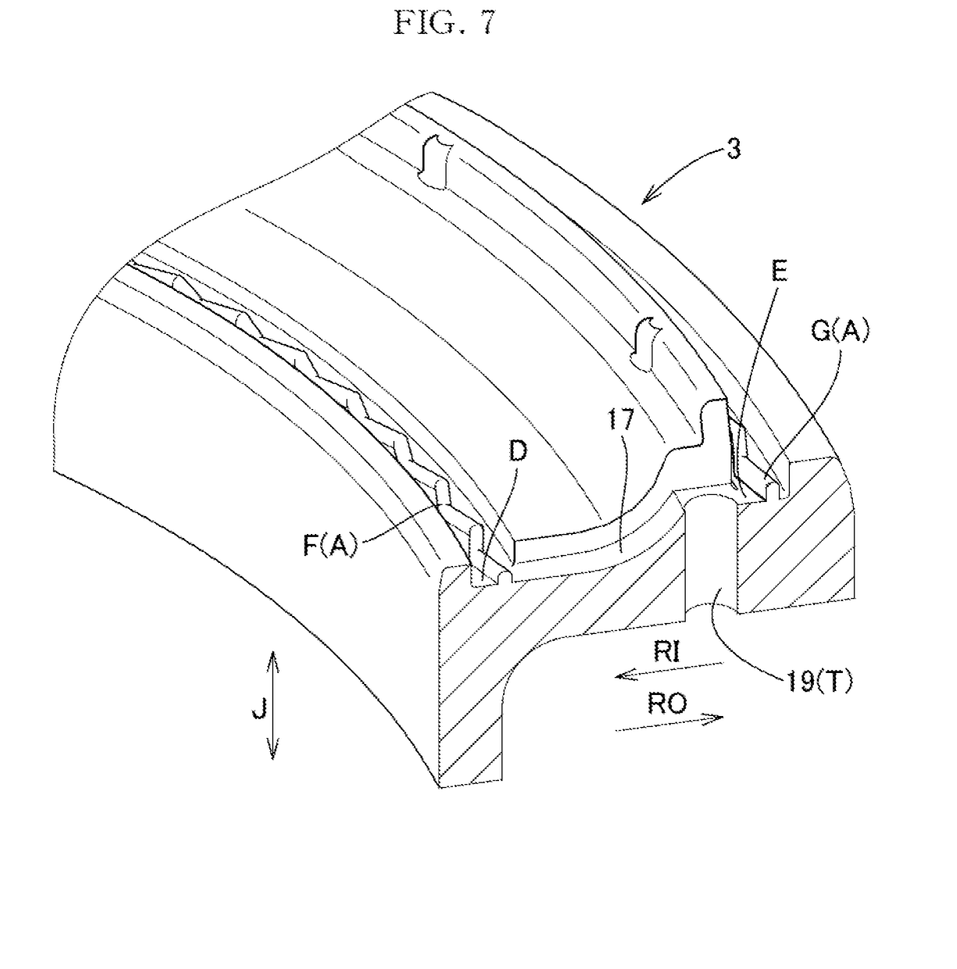
FIG. 7 is a perspective view of an enlarged main part with a partially vertical cross-sectional view, showing the lower case seen from above.

As shown in the vertical cross-sectional view of FIG. 3, the perspective view with the partially vertical cross-sectional view of FIG. 5, the perspective view of FIG. 6, and the perspective view with the partially vertical cross-sectional view of FIG. 7, an axially end face 8C, from which the seal lip 8B of the annular base 8A in the inner-diameter side seal 8 does not project, is tightly in contact with an annular joint surface D positioned in the radially inner direction RI of the lower case 3. An axially end face 9C, from which the seal lip 9B of the annular base 9A of the outer-diameter side seal 9 does not project, is tightly in contact with an annular joint surface E positioned in the radially outer direction RO of the lower case 3.

The annular joint surface D has a case-side projection F that projects upward, and the annular joint surface E has a case-side projection G that projects upward. The inner-diameter side seal 8 has a seal-side recess H that is dented upward to be fitted to the case-side projection F, and the outer-diameter side seal 9 has a seal-side recess I that is dented upward to be fitted to the case-side projection G.

<Shapes of Case-Side Projection and Seal-Side Recess, Sizes of Case-Side Projection and Seal-Side Recess>

Figure 8:
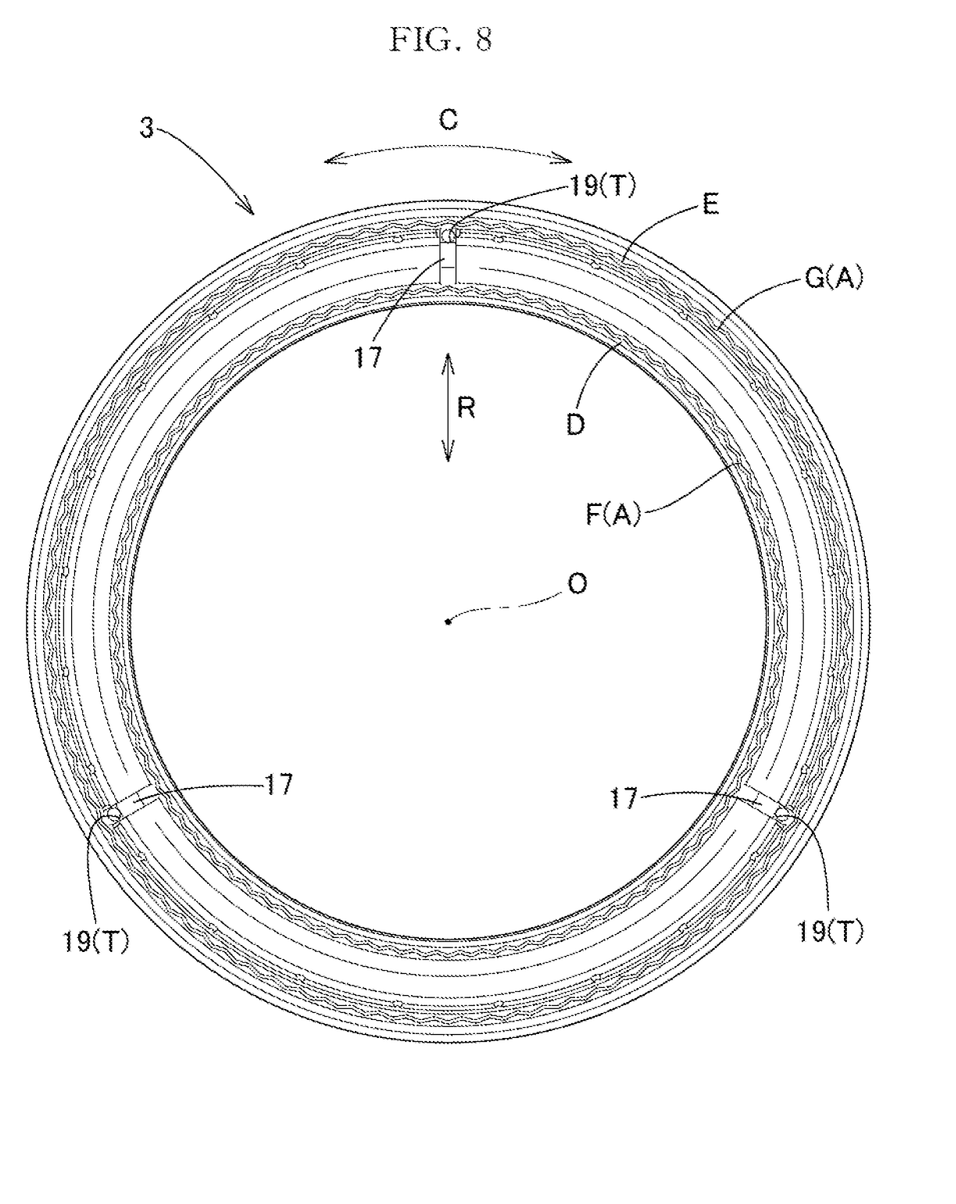
FIG. 8 is a plan view showing the lower case.

As shown in the plan view of FIG. 8, shapes of the case-side projection F and the case-side projection G of the lower case 3, seen in the axial direction J (FIG. 1), are each a triangular wave shape that continues in the circumferential direction C. In other words, the shapes correspond to a shape A that continues in the circumferential direction C, and varies its position in the radial direction R along the circumferential direction C. The case-side projections F and G in the lower case 3 continue in the circumferential direction C, so that the rigidity of the respective case-side projections F and G in the circumferential direction increases.

As shown in the vertical cross-sectional view of FIG. 3, and the perspective view of FIG. 6, the seal-side recess H of the inner-diameter side seal 8 is fitted to the case-side projection F of the lower case 3, and the seal-side recess I of the outer-diameter side seal 9 is fitted to the case-side projection G of the lower case 3. Accordingly, each of the shapes of the seal-side recesses H and I, seen in the axial direction J, is also a triangular wave shape that continues in the circumferential direction C. In other words, the shapes correspond to the shape A that continues in the circumferential direction C, and varies its position in the radial direction R along the circumferential direction C.

Figure 9A:
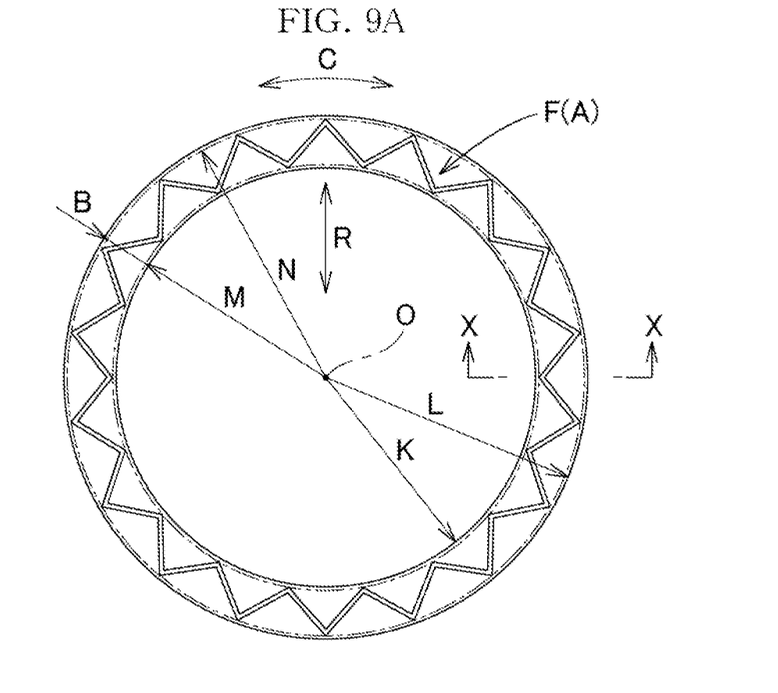
FIG. 9A is a schematic plan view showing an example of a shape of a case-side projection.
Figure 9B:
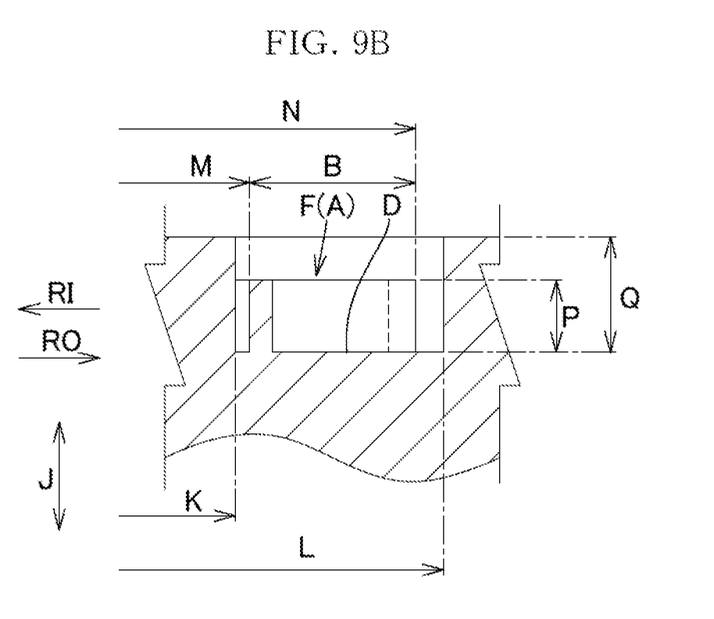
FIG. 9B is a cross-sectional view taken along the arrow X-X in FIG. 9A.

As shown in the schematic plan view of FIG. 9A, and the cross-sectional view of FIG. 9B, which is taken along the arrow X-X of the FIG. 9A, a range B of the case-side projection F in the radial direction R, i.e., a range from a minimum diameter M to a maximum diameter N of the case-side projection F is larger than a minimum diameter K of the annular base 8A of the inner-diameter side seal 8 (an inner diameter of the annular joint surface D) and smaller than a maximum diameter L of the annular base 8A (an outer diameter of the annular joint surface D) (M>K, N<L). The same is applied to a range of the case-side projection G in the radial direction R. In addition, as shown in the vertical cross-sectional views of FIGS. 9B and 3, a height P of the case-side projection F is shorter than or equal to a height Q of the annular base 8A (P≤Q). Similarly, a height of the case-side projection G is shorter than or equal to a height of the annular base 9A.

Figure 10A:
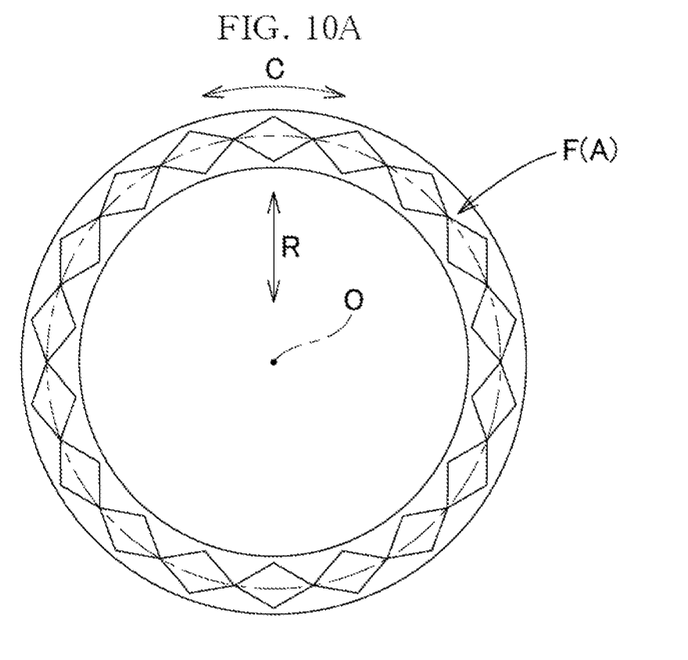
FIG. 10A is a schematic plan view showing a modified example of the shape of the case-side projection, the view being simplified by removing a thickness of the case-side projection.
Figure 10B:
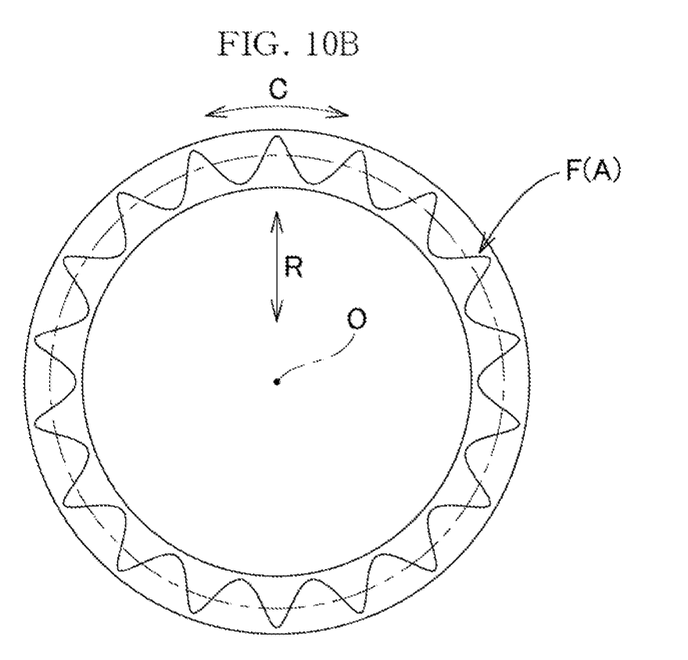
FIG. 10B is a schematic plan view showing another modified example of the shape of the case-side projection, the view being simplified by removing the thickness of the case-side projection.
Figure 10C:
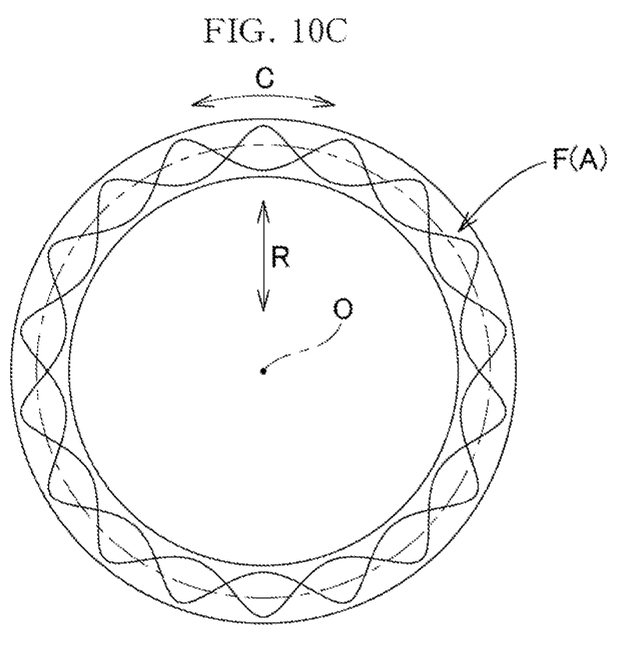
FIG. 10C is a schematic plan view showing still another modified example of the shape of the case-side projection, the view being simplified by removing the thickness of the case-side projection.

Each of the shapes A of the case-side projections F, G and the seal-side recesses H, I, seen in the axial direction J, continues in the circumferential direction C, and varies its position in the radial direction R along the circumferential direction C. Such a shape A is not limited to the triangular wave shape that continues in the circumferential direction C, as shown in the plan view of FIG. 8 and schematic plan view of FIG. 9A. For example, the shape A may be: a shape in which rhombic shapes are continuously aligned in the circumferential direction C as shown in the schematic plan view of FIG. 10A; sine wave shapes continuing in the circumferential direction C, as shown in the schematic plan view of FIG. 10B; a waveform in which a peak of one of two sine wave shapes and a trough of the other one of the two sine wave shapes are matched and continuously aligned, as shown in the schematic plan view of FIG. 10C; and so on. The shape A is not limited to a shape that periodically repeats in the circumferential direction C, and may not be a shape that periodically repeats in the circumferential direction C.

<Method of Producing Lower Case and Seal>

Next, an example of a method of producing each of the lower case 3, the inner-diameter side seal 8, and the outer-diameter side seal 9, in the strut bearing device 1 is described.

(Molding of Lower Case that is Primary Molded Article)

An injection molding step of injecting a melted synthetic resin into a cavity of a first molding die (not shown) from gates of the first molding die for molding the lower case 3 having a shape shown in the perspective view with the partially vertical cross-sectional view of FIG. 5 and the perspective view of FIG. 6 is performed to mold the lower case 3 having the aforementioned shape.

(Molding of Seal that is Secondary Molded Article)

The lower case 3 removed from the first molding die is placed, as an insert work, in a second molding die (not shown) for molding the inner-diameter side seal 8 and the outer-diameter side seal 9 which have the shapes shown in the perspective view with the partially vertical cross-sectional view of FIG. 5 and the perspective view of FIG. 6, and then the second molding die is closed. In a state where a temperature of the second molding die is adjusted to a predetermined temperature, an insert injection molding step is performed to inject melted elastomer into a cavity of the second molding die from, for example, three gates of the second molding die respectively at gate positions T (also see FIG. 8) that are respectively positioned below through holes 19 of the lower case 3 and respectively connect to the through holes 19.

As shown in the perspective view with the partially cross-sectional view of FIG. 5 and the perspective view of FIG. 6, the lower case 3 is provided with grooves 17 each of which connects to the corresponding one of the through holes 19 and extends in the radial direction, so that the inner diameter side and the outer diameter side of the lower case 3 communicate with each other by the grooves 17. Thus, the molten elastomer passes from the through holes 19 in the lower case 3 through the grooves 17, so as to be charged in an inside of the second molding die for molding the inner-diameter side seal 8 and the outer-diameter side seal 9. Accordingly, the inner-diameter side seal 8 and the outer-diameter side seal 9 which have the shapes as described above are molded.

As shown in the perspective view with the partially vertical cross-sectional view of FIG. 5, and the perspective view of FIG. 6, connecting portions 18 are molded between the inner-diameter side seal 8 and the outer-diameter side seal 9, to be respectively fitted in the grooves 17, and cylindrical members 20 respectively connecting to the connecting portions 18 are molded to be respectively fitted in the through holes 19 in the lower case 3.

As described above, both the inner-diameter side seal 8 and the outer-diameter side seal 9 are molded by merely injecting the molten elastomer from, for example, three gates of the second molding mold. Accordingly, the number of gates can be thus reduced, thereby simplifying a mold structure. Therefore, a cost for a mold can be prevented from increasing.

According to the methods of producing the lower case 3, inner-diameter side seal 8, and the outer-diameter side seal 9 as described above, the inner-diameter side seal 8 is joined to the annular joint surface D of the lower case 3 by chemical bonding at the joint interface, and the outer-diameter side seal 9 is joined to the annular joint surface E of the lower case 3 by the chemical bonding at the joint interface. Here, the chemical bonding means a chemically joined state by a polar factor.

The seal-side recess H of the inner-diameter side seal 8 is fitted to the case-side projection F at the annular joint surface D. Each of the shapes of the case-side projection F and the seal-side recess H, seen from the axial direction J, corresponds to the shape A that continues in the circumferential direction C and varies its position in the radial direction R along the circumferential direction C. In addition, the seal-side recess I of the outer-diameter side seal 9 is fitted to the case-side projection G at the annular joint surface E. Each of the shapes of the case-side projection G and the seal-side recess I, seen from the axial direction J, corresponds to the shape A that continues in the circumferential direction C and varies its position in the radial direction R along the circumferential direction C.

With this configuration, the shape of each of the joint interfaces between the seal-side recesses H, I and the case-side projections F, G, seen from the axial direction J, is a wave shape that continues in the circumferential direction C. Accordingly, as an area of the joint interface between the inner-diameter side seal 8 and the lower case 3 increases, an area of the joint interface between the outer-diameter side seal 9 and the lower case 3 increases. Therefore, the joining strength due to the chemical bonding at the joint interface can be further increased. In addition, the shape of each of the joint interfaces between the seal-side recesses H, I and the case-side projections F, G is a wave form that continues in the circumferential direction C. Accordingly, the inner-diameter side seal 8 and the outer-diameter side seal 9 are engaged with the lower case 3 in the circumferential direction C and the radial direction R. Therefore, the inner-diameter side seal 8 and the outer-diameter side seal 9 are connected to the lower case 3 both chemically and mechanically, so that contact reliability is enhanced. In addition, no thin portion is generated in the first molding mold for molding the lower case 3 including the case-side projections F, G, thereby lowering a breakage risk of the mold.

Furthermore, since the rigidity of the case-side projections F, G in the circumferential direction is high as described above, deformation of the annular bases 8A, 9A of the seals 8 and 9 in the circumferential direction is prevented in a case where the seal lips 8B, 9B of the seals 8, 9 slide along the upper case 2 to cause sliding torque to be generated. Accordingly, stress occurring at the joint interfaces between the case-side projections F, G and the seal-side recesses H, I can be reduced, thereby maintaining high reliability for a long term.

In the above description, an example is described in which the annular joint surfaces D, E in the lower case 3 are respectively provided with the case-side projections F, G, the inner-diameter side seal 8 is provided with the seal-side recess H, and the outer-diameter side seal 9 is provided with the seal-side recess I. Here, the present invention is not limited to such an exemplified configuration. Each of the annular joint surfaces D, E of the lower case 3 may be provided with "a case-side recess" that is dented in the lower side, and each of the seals 8, 9 may be provided with "a seal-side projection" that projects in the lower side. In such a case, a shape of "the case-side recess" seen from the axial direction J and a shape of "the seal-side projection" seen from the axial direction J also continue in the circumferential direction, and vary their positions in the radial direction R along the circumferential direction C.

In the above description, an example is described in which the seals 8, 9 are joined to the lower case 3, and the seal lips 8B, 9B are slidably contact with the upper case 2. Here, the present invention is not limited to such an exemplified configuration. The seals may be joined to the upper case 2, and the seal lips thereof may be in slidably contact with the lower case 3. In such a case, an annular joint surface will be provided in the upper case 2 and "a case-side projection" that projects in the lower side or "a case-side recess" that is dented in the upper side may be provided in the annular joint surface, and "a seal-side recess" that is dented in the lower side or "a seal-side projection" that projects in the upper side will be provided in an end surface of the annular base of the seal. In this case, a shape of "the case-side projection" or "the case-side recess" seen in the axial direction J and a shape of "the seal-side recess" or "the seal-side projection" seen in the axial direction J also continue in the circumferential direction C, and vary their positions in the radial direction R along the circumferential direction C.

Although both the inner-diameter side seal 8 and the outer-diameter side seal 9 are joined to the lower case 3, and both the inner-diameter side seal 8 and the outer-diameter side seal 9 are joined to the upper case 2 in the above description, the inner-diameter side seal 8 and the outer-diameter side seal 9 may be separately joined to the upper case 2 and the lower case 3. In other words, the inner-diameter side seal 8 may be joined to the lower case 3, and the outer-diameter side seal 9 may be joined to the upper case 2. Similarly, the inner-diameter side seal 8 may be joined to the upper case 2 and the outer-diameter side seal 9 may be joined to the lower case 3.

<Method of Producing Upper Case and Seal>

Next, an example of producing the upper case 2 and the seal is described with reference to an example in which the seal is joined to the upper case 2.

(Molding of Upper Case that is Primary Molded Article)

An injection molding step of injecting a melted synthetic resin into a cavity of the first molding die from gates of the first molding for molding the upper case 2 having a desired shape, so as to mold the upper case 2 having such a shape.

(Molding of Seal that is Secondary Molded Article)

The upper case 2 removed from the first molding die is placed, as an insert work, in the second molding die for molding a seal having a desired shape, and then the second molding die is closed. In a state where a temperature of the second molding die is adjusted to a predetermined temperature, melted elastomer is injected into a cavity of the second molding die from gates of the second molding die, to thereby perform an injection molding step for molding a seal having the desired shape. With the processing, the upper case 2 and the seal are joined at the joint interface by the chemical bonding.

When at least one of the lower case 3 and the upper case 2 which are the primary molded articles is subjected to the injection molding by using the first molding die, it is preferable to roughen all or a part of a portion to which a bottom surface and a side surface of the annular base of the seal in the lower case 3 or the upper case 2 is joined, by shot blasting, or the like. With the processing, the lower case 3 or the upper case 2 is more strongly joined with a proximal end portion of the seal, thereby further increasing the joining strength of the seal with the lower case 3 or the upper case 2.

The above description of the embodiments are all examples, and thus the present invention is not limited thereto. Various improvements and modifications without departing from the scope of the present invention can be applied.

What is claimed is:

1. A strut bearing device comprising:
   an uppercase;
   a lower case;
   an upper raceway ring held by the upper case;
   a lower raceway ring held by the lower case;
   a rolling element that rolls between the upper raceway ring and the lower raceway ring; and
   a seal positioned in at least one of a radially inner side of the rolling element and a radially outer side of the rolling element, wherein
   the upper case and the lower case are made of a synthetic resin,
   the seal is made of elastomer,
   the seal has an annular base and a seal lip projecting from the annular base,
   the annular base has an axially end face from which no seal lip projects, the axially end face being in contact with an annular joint surface of the upper case or an annular joint surface of the lower case,
   the annular joint surface has one of a case-side projection projecting in an axial direction and a case-side recess dented in the axial direction,
   each of the case-side projection and the case-side recess has a shape seen in the axial direction, the shape continuing in a circumferential direction and varying a position of the shape in a radial direction along the circumferential direction, and the seal has one of a seal-side recess having a shape that is fitted to the case-side projection, and a seal-side projection having a shape that is fitted in the case-side recess.

2. A vehicle strut suspension comprising the strut bearing device according to claim 1.

3. A method of producing a lower case and a seal which are included in a strut bearing device,
wherein
the seal is positioned in at least one of a radially inner side of a rolling element of the strut bearing device and a radially outer side of the rolling element,
the lower case is made of a synthetic resin,
the seal is made of elastomer,
the seal has an annular base and a seal lip projecting from the annular base,
the annular base has an axially end face from which no seal lip projects, the axially end face being in contact with an annular joint surface of the lower case,
the annular joint surface of the lower case has one of a case-side projection projecting in an axial direction and a case-side recess dented in the axial direction,
each of the case-side projection and the case-side recess, of the lower case, has a shape seen in the axial direction, the shape continuing in a circumferential direction and varying a position of the shape in a radial direction along the circumferential direction,
the method comprising:
an injection molding step of injecting the synthetic resin that is melted, from a gate of a first molding die for molding the lower case having the shape, and
an insert injection molding step of injecting the elastomer that is melted, from a gate of a second molding die, in a state where the lower case removed from the first molding die is placed, as an insert work, in the second molding die for molding the seal having the shape.

4. A method of producing an upper case and a seal which are included in a strut bearing device,
wherein
the seal is positioned in at least one of a radially inner side of a rolling element of the strut bearing device and a radially outer side of the rolling element,
the upper case is made of a synthetic resin,
the seal is made of elastomer,
the seal has an annular base and a seal lip projecting from the annular base,
the annular base has an axially end face from which no seal lip projects, the axially end face being in contact with an annular joint surface of the upper case,
the annular joint surface of the upper case has one of a case-side projection projecting in an axial direction and a case-side recess dented in the axial direction,
each of the case-side projection and the case-side recess, of the upper case, has a shape seen in the axial direction, the shape continuing in a circumferential direction, and varying a position of the shape in a radial direction along the circumferential direction,
the method comprising:
an injection molding step of injecting the synthetic resin that is melted, from a gate of a first molding die for molding the upper case having the shape, and
an insert injection molding step of injecting the elastomer that is melted from a gate of a second molding die in a state where the upper case removed from the first molding die is placed, as an insert work, in the second molding die for molding the seal having the shape.

* * * * *